Dec. 30, 1969  D. J. TOMAN  3,487,411
MULTIPLE-BEAM GUIDANCE MEANS FOR AIRCRAFT APPROACH AND LANDING
Filed Aug. 22, 1968
*FIG. 1*
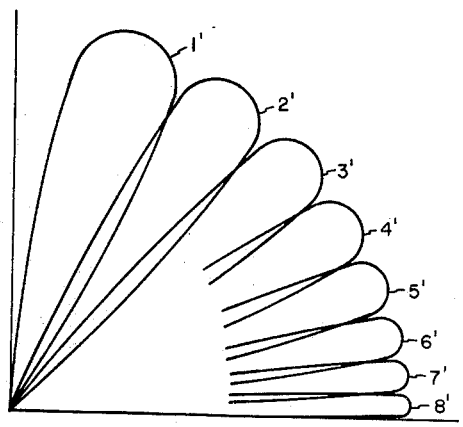
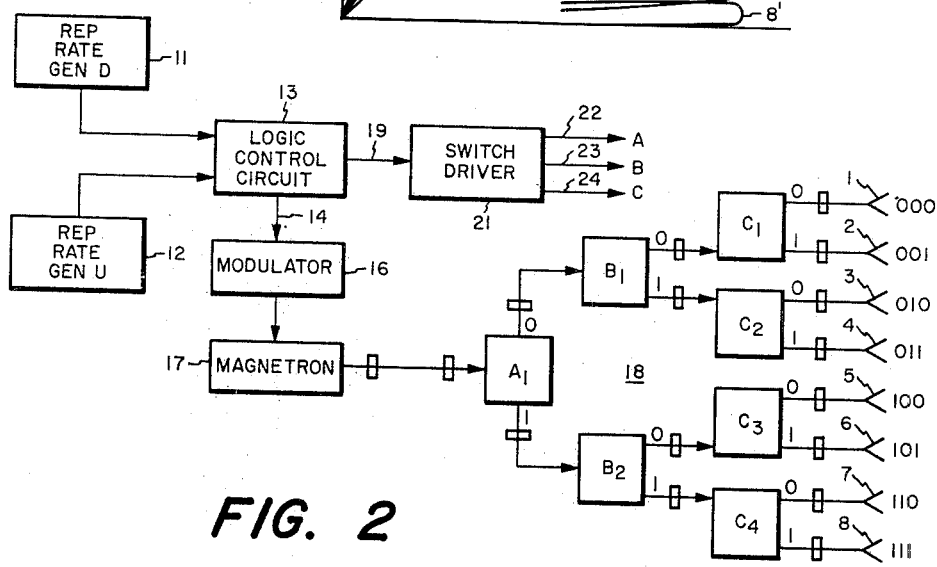
*FIG. 2*
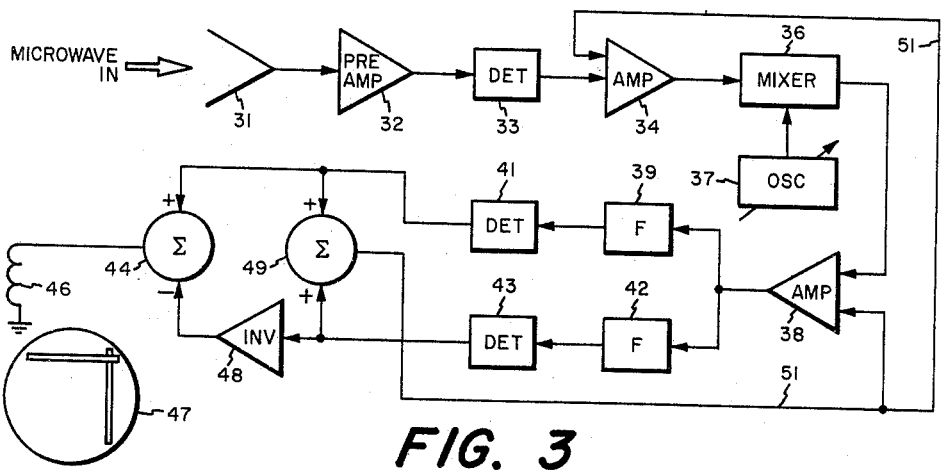
*FIG. 3*

United States Patent Office 3,487,411
Patented Dec. 30, 1969

3,487,411
MULTIPLE-BEAM GUIDANCE MEANS FOR AIRCRAFT APPROACH AND LANDING
Donald J. Toman, Pleasantville, N.Y., assignor to Singer-General Precision, Inc., a corporation of Delaware
Filed Aug. 22, 1968, Ser. No. 754,623
Int. Cl. G01s 1/16, 1/18
U.S. Cl. 343—108                10 Claims

ABSTRACT OF THE DISCLOSURE

An aircraft guidance system is provided in which a transmitter directs a multiplicity of microwave beams, for example: eight, so that in total they cover the expected approach space. Each beam is fan shaped wide in azimuth and narrow in elevation angle with each having a different elevation angle so that contiguous beams overlap. Each beam is modulated with information signals bearing fly-up or fly-down intelligence and the beams with their information signals are projected in sequence for selected intervals of time starting with that having the highest elevation angle and proceeding to that having the lowest. This sequential energization or scan is repeated for a program of say eight such scans. During later scans the information signals carried by any single beam may be changed to fly-down information from fly-up information so that over the entire program the selected beam carries equal amounts of fly-up and fly-down information, while the other beams predominate in either fly-up or fly-down intelligence. Thus over a time average the totality of the intelligence in one beam will direct neither a fly-down or fly-up condition, while beams at a higher angle of elevation will indicate a fly-down situation and those at a lower angle of elevation will indicate a fly-up situation.

Various aircraft landing and approach guidance systems have been suggested including rotating beams as well as overlapping beams, in which the guidance path is defined by the reception of equal amounts of signals from a pair of overlapping beams. When only two overlapping beams are used the beams must be fairly wide in elevation angle, otherwise, the entire guidance space is not covered with appropriate signals. Likewise, the use of narrow beams define only a narrow linear course, the linearity of response dropping off rapidly as the aircraft departs from the true guidance path. On the other hand, when wide beams are used, distortion is introduced by reflection from the ground and other objects which introduce undesired inaccuracies.

The present invention provides a system in which a multiplicity of narrow beams are produced at different elevation angles, with the beams overlapping to fill the expected guide space. The beams are successively illuminated during discrete intervals of time and during each individual illumination period, one or more information signals are impressed thereon. Likewise through a program period, defined as a selected number of scans through the individual beams covering the guidance space, in the present instance, eight, being selected as an example, the information content of any selected beam may be varied to provide a time weighted content, when applied to an appropriate receiver, may then be used to select and maintain a selected glide path.

An object of the invention is to provide an aircraft landing guidance system which is accurate and linear in operation when imposed on a properly equipped aircraft.
A further object of the invention is to provide an aircraft landing system in which different glide paths may be selected at option of the aircraft pilot.

The invention may be more fully understood from the following detailed description taken together with the accompanying drawings in which:

FIGURE 1 is a diagrammatic illustration of the beam propagation pattern viewed in elevation.
FIGURE 2 is a block diagram of the transmitter of the invention.
FIGURE 3 is a block diagram of a receiver suitable for receiving and interpreting the signals generated by the transmitter.

Referring now to FIGURE 2, a series of eight microwave antennas 1–8 inc. are so arranged as to propagate beams of microwave energy each at different discrete angles of elevation. FIGURE 1 illustrates the beam lobe pattern produced by the array with the primed reference characters indicating the beam produced by the corresponding antenna. It will be noted by reference to FIGURE 1 that the beams progressively increase in elevation width as their elevation angles increase. That is to say, the beam 8' produced by antenna 8 having the lowest elevation angle is the narrowest in elevation, while beam 1' produced by antenna 1 having the higher elevation angle is also the widest in elevation. This may be easily accomplished by a progressive variation in antenna aperture sizes and it has been found advantageous to so vary the antenna apertures as to produce beams whose width in elevation angle constitutes a geometric progression proceeding from the lowest elevation angle to the highest. It will be appreciated, of course, that in order to fill the expected glide space each of the beams is elliptical or fan shaped, that is, wide in the directions normal to the plane of elevation as depicted in FIGURE 1. Because the beams having the lowest elevation angles are relatively narrow in elevation, they are not so greatly affected by ground reflection and distortion and greater accuracy is provided at low glide slope angles. On the other hand, ground distortions do not affect the beams at high elevation angles and at their higher angles of elevation the departure from exact glide slope angle is not so important, so that these beams may be made broader in elevation angle.

Returning now to FIGURE 2, a pair of repetition rate generators 11 and 12 generate the information signals which are to instruct the pilot either to fly-up or fly-down. Generator 11, for example, may produce a signal having a frequency of 102 kHz. as a fly-down or D signal, whereas generator 12 may produce a signal having a frequency 101 kHz. as a fly-up or U signal.

The outputs of the generators 11 and 12 are impressed on the logic control circuit 13, which is programmed to transmit the outputs of one or the other of generators during selected time intervals of say 1.25 ms. over conductor 14 to the modulator 16, which in turn modulates the output of the magnetron 17 so that the output and the magnetron consists of 15.5 kHz. energy in 50% duty-rate pulse trains.

The output of the magnetron 17 is impressed on the base of switch tree indicated generally at 18 consisting of a base switch $A_1$; intermediate branch switches $B_1$, $B_2$ and terminal branch switches $C_1$, $C_2$, $C_3$ and $C_4$. These switches may be crystal diode switches of well-known design. That is to say, they may comprise T wave guide junctions having crystal diodes inserted in each of the colinear arms. By applying suitable potentials to the diodes, microwave energy is reflected from the diode in one arm while the diode in the other arm is in such a condition as to permit the transmission of microwave energy therethrough. In other words, these switches are the microwave equivalent of single pole double throw switches.

A second output of the logic control circuit 13 produces programed signals to conductor 19 which in turn operate switch driver 21 to cause appropriate switching signals to appear on conductors 22, 23, and 24. The signals on these later conductors are imposed on the appropriate banks of the tree switch 18 to operate the particular individual switches thereof in selected sequence. To avoid overcomplication of conductor lines, these lines have not been shown as connected to the indivdual switches, instead the latter A opposite line 22 indicates that the signals on these conductor controls the $A_1$ bank switch; the letter B opposite conductor 23 indicates that signals on the conductor controls the $B_1$, $B_2$ bank switches and finally the signals on conductor 24 control the $C_1$, $C_2$, $C_3$ and $C_4$ bank switches.

The logic control circuit 13 may be programmed to produce as an output a sequential series of binary words from say 000 to 111 at discrete time intervals of 1.25 ms. For example, when 0 signals are impressed on each of conductors 22, 23 and 24 through the switch driver 21, signals are routed from the output of the magnetron 17 through the 0 port at switch $A_1$, through the 0 port at switch $B_1$, the 0 port of switch $C_1$ to the antenna 1, which is now energized for this 1.25 ms. period of time, so indicated by the binary word 000 appearing opposite antenna 1 in FIGURE 2. During the next 1.25 ms. period of time, the logic control circuit 13 operates to produce an output corresponding to the logic word 001. This in turn causes an 0 signal to appear on each of conductors 22 and 23 and a 1 signal to appear on conductor 24 so that the output of the magnetron 17 is now routed through the 0 port of switch $A_1$, the 0 port of switch $B_1$ and the 1 port of switch $C_1$ to the antenna 2 energizing this antenna for the second 1.25 ms. period. As will be apparent the switching action proceeds through successive 1.25 ms. intervals to the eight such interval when 1 signals appear on each of conductors 22, 23 and 24, so that the output of the magnetron is routed through the 1 port of switch $A_1$, the 1 port of switch $B_2$ and the 1 port of switch $C_4$ energizing antenna 8. This completes a single scan of the eight antenna area so that each has been energized successively.

The logic control circuit is so programmed that eight successive scans through the array of antennas 1-8 are had before the program is repeated. At the same time, during each successive 1.25 ms. interval, the logic control circuit 13 is so programmed that the magnetron 17 is modulated by one or the other of the repetition rate signals obtained from repetition rate generators 11 or 12 so that as each individual antenna is energized during any particular scan it bears one or the other information signals D or U, obtained from generator 11 or 12. With this in mind, the following program Table 1 may be set up to indicate a simple glide path program.

TABLE 1

| Scan No. | ANTENNA | | | | | | | |
|---|---|---|---|---|---|---|---|---|
| | 1 | 2 | 3 | 4 | 5 | 6 | 7 | 8 |
| 1 | D | D | U | U | U | U | U | U |
| 2 | D | D | U | U | U | U | U | U |
| 3 | D | D | U | U | U | U | U | U |
| 4 | D | D | U | U | U | U | U | U |
| 5 | D | U | U | U | U | U | U | U |
| 6 | D | U | U | U | U | U | U | U |
| 7 | D | U | U | U | U | U | U | U |
| 8 | D | U | U | U | U | U | U | U |

From the above Table 1 it will be apparent that during the first scan through the antenna array, antennas 1 and 2 during their period of energization have the transmitted signal modulated with the 102 kHz. fly-down (D) signal while antennas 3 to 8 are energized by the carrier signal derived from the magnetron 17 modulated by the 101 kHz. fly-up (U) signal. As will be seen by reference to Table 1, this pattern of scan and modulation recurs through the first 4 antenna array scans. On the fifth scan, however, only antenna 1 is modulated during its energization period with the fly-down modulation signals, while all the remaining antennas of the array are modulated with the fly-up modulation signals. During the entire program period recurring at the rate of 12.5 Hz. antenna 1 is always modulated with fly-down signals, while antennas 3 to 8 are always modulated with fly-up signals. Antenna 2, however, is modulated with fly-down signals half of the time and during the remainder is modulated with fly-up signals, so that over the time average of the entire program period fly-down signals are exactly counterbalanced by fly-up signals.

Suppose then, an aircraft is flying in the beam of illumination of antenna 1 i.e.: beam 1' of FIGURE 1. Its receiver, in the manner to be described hereinafter, will always receive fly-down signals and its indicator will so indicate, informing the pilot that he is above his desired approach angle. A similar situation will obtain if the aircraft is in any one of beams 3' to 8' except that maximum fly-up indication will be received, indicating to the pilot that he is too low. If, however, the aircraft is in beam 2' the time average of received fly-down signals is exactly balanced by the time average of fly-up signals and the receiver indicator will assume its neutral position, indicating to the pilot that he is at the proper glide slope position.

From the above discussion of the program of Table 1, it will be apparent that if the aircraft is not at the proper approach angle position, maximum fly-down or fly-up indications will always be received. In some instances it may be desirable that the pilot be informed that he is near or approaching the proper approach angle by so adjusting the program that less than maximum direction signal is received and hence less than full indicator deflection attained as the proper elevation angle is approached. In such instances a program such as illustrated in the following Table 2 may be used.

TABLE 2

| Scan No. | ANTENNA | | | | | | | |
|---|---|---|---|---|---|---|---|---|
| | 1 | 2 | 3 | 4 | 5 | 6 | 7 | 8 |
| 1 | D | D | D | D | D | D | U | U |
| 2 | D | D | D | D | D | U | U | U |
| 3 | D | D | D | D | U | U | U | U |
| 4 | D | D | D | D | U | U | U | U |
| 5 | D | D | D | U | U | U | U | U |
| 6 | D | D | D | U | U | U | U | U |
| 7 | D | D | U | U | U | U | U | U |
| 8 | D | U | U | U | U | U | U | U |

From the above Table 2, it will be seen that over the program period of 2/25 sec. maximum fly-down signals are transmitted by antenna 1 and maximum fly-up signals are transmitted by antennas 7 and 8. Antenna 2, however, and hence beams 2' is modulated with fly-up signals during the eight scan and fly-down signals during the remainder of the program period, so that as impressed on the receiver the time average is less than maximum fly-down indications and the receiver indicator will be deflected by slightly less than the maximum deflection. Similarly, as respects antenna 3 and hence beam 3' two scan periods are used to modulate the transmitted signal with fly-up signals, while during the remainder of the scan periods, the transmitted beam is modulated with fly-down signals, so that the time average indication of fly-down is less than that obtained from beam 2' indicating a closer approach to proper glide slope position.

As discussed in connection with Table 1, beam 4' is modulated with fly-up and fly-down signals for equal periods of time over the entire program period, so that zero deflection of the receiver indicator will be obtained, indicating proper approach position. Beams 5' and 6' similar to beams 2' and 3' have small portions of fly-down signals impressed thereon, during the program period, so that the time average of the fly-up indications is less than maximum leading to less than maximum fly-up instructions.

The above discussion has referred to an arrangement for producing only a single glide slope angle indication, using a single pair of fly-up and fly-down modulation signals. It is possible, however, to provide a much more versatile system providing multiple glide slope indications, which may be selected at will by the pilot. For example, rather than using merely two repetition rate generators 11 and 12, supplying fly-up and fly-down information, the number of such generators may be increased and each energization period of 1.25 ms. of each antenna may be time shared between different modulation signals carrying selected information indications. Such a time sharing program providing two different selectable glide slopes is illustrated in the following Table 3, in which D and U represent the fly-down and fly-up signals of 102 kHz. and 101 kHz. respectively and $D_1$ and $U_1$ indicates fly-down and fly-up signals of 112 kHz. and 111 kHz. respectively.

TABLE 3

| Scan No. | Antenna 1 | | 2 | | 3 | | 4 | | 5 | | 6 | | 7 | | 8 | |
|---|---|---|---|---|---|---|---|---|---|---|---|---|---|---|---|---|
| 1 | D | $D_1$ | D | $D_1$ | D | $D_1$ | D | $D_1$ | D | $D_1$ | D | $D_1$ | U | $D_1$ | U | $U_1$ |
| 2 | D | $D_1$ | D | $D_1$ | D | $D_1$ | D | $D_1$ | D | $D_1$ | U | $D_1$ | U | $U_1$ | U | $U_1$ |
| 3 | D | $D_1$ | D | $D_1$ | D | $D_1$ | D | $D_1$ | U | $D_1$ | U | $U_1$ | U | $U_1$ | U | $U_1$ |
| 4 | D | $D_1$ | D | $D_1$ | D | $D_1$ | U | $D_1$ | U | $U_1$ | U | $U_1$ | U | $U_1$ | U | $U_1$ |
| 5 | D | $D_1$ | D | $D_1$ | U | $D_1$ | U | $U_1$ | U | $U_1$ | U | $U_1$ | U | $U_1$ | U | $U_1$ |
| 6 | D | $D_1$ | D | $D_1$ | D | $D_1$ | U | $D_1$ | U | $U_1$ | U | $U_1$ | U | $U_1$ | U | $U_1$ |
| 7 | D | $D_1$ | D | $D_1$ | U | $D_1$ | U | $U_1$ | U | $U_1$ | U | $U_1$ | U | $U_1$ | U | $U_1$ |
| 8 | D | $D_1$ | U | $D_1$ | U | $U_1$ | U | $U_1$ | U | $U_1$ | U | $U_1$ | U | $U_1$ | U | $U_1$ |

An inspection of the program pattern of Table 3 will reveal that insofar as the fly-down (D) and fly-up (U) signals are concerned, the pattern is the same as that presented in Table 2 so that the glide path is delimited by beam 4' radiated by antenna 4, with beams 2', 3', 5' and 6' containing lesser amounts of directional information than is present in the remaining beams. Considering now the information signal represented by the fly-down ($D_1$) and fly-up ($U_2$) modulations, it will be noted that the program pattern has been in effect, shifted downward by one beam. That is, the correct glide path is now delimited by beams 5' with the beams on either side providing appropriate amounts of guidance information.

Where desired, to provide a greater number of guide paths or provide an arrangement for changing guide paths during approach to provide a suitable flair out landing, each antenna illumination period may be time shared by a greater number of modulation information signals.

Alternatively the fly-down D and fly-up U signals may occupy the full 1.25 ms. periods of each antenna energization during one full program period $2/25$ sec. while the fly-down $D_1$ and fly-up $U_1$ signals occupy the full 1.25 ms. periods during the succeeding full program period of $2/25$ sec.

The receiver, which will now be described, may be provided with circuitry so that at the will of the operator, any desired pair of fly-down, fly-up signals may be used selectively to energized an indicator at any particular time to the exclusion of other pairs of information signal modulations.

Referring now to the circuit of FIGURE 3, a suitable receiving circuit is disclosed in block form for converting the information modulation signals contained in the eight beams 1' to 8' inclusive into pilot visual representations.

The receiver is provided with a conventional horn antenna 31 and for present purposes it will be assumed that the receiver is adjusted to derive information from the 101 kHz. fly-up (U) and the 102 kHz. fly-down (D) modulation signals. For the present, let it also be assumed that the aircraft carrying the receiver is at such a position that it is the path of a beam modulated with the 101 kHz. fly-up (U) signals. The pulsed carrier signal modulated by the 101 kHz. modulation signal is received by the antenna 31 and fed to a standard microwave preamplifier 32 from which it is applied to a video detector 33 and video amplifier 34, in which the 101 kHz. modulation is recovered and the carrier frequency suppressed in the conventional manner. Thus, the output of the amplifier 32 comprises a substantially sinusoidal waveform having a frequency content of 101 kHz.

The output of the amplifier 34 is applied to the input of a mixer 36, which also has the output of a variable oscillator 37 applied thereto. For the present, let it be assumed that the oscillator is adjusted so as to produce an output signal having a frequency of 100 kHz., so that an output signal derived from the mixer 36 is a signal having a frequency of 1000 Hz. This signal is in turn applied to an amplifier 38, which includes in its input stage a low-pass filter network which passes frequencies below 2000 Hz. and rejects frequencies above 2000 Hz.

The output of the amplifier 38 is impressed simultaneously on two frequency selective circuits, one of which includes a bandpass filter 39, sharply tuned to 1000 Hz. and a diode detector 41. The other frequency selective circuit includes a bandpass filter 42, sharply tuned to 2000 Hz. and a diode detector 43. Hence, the 1000 Hz. signal derived from amplifier 38 is passed by filter 39 and rectified by detector 41, whereas, it is rejected by filter 42. The output of detector 41 constitutes a positive direct current signal, which is proportional to the time average of the 1000 Hz. signal available at the output of the amplifier 38. This direct current signal is applied to the summing circuit 44 and thereafter, to the actuating coil, which moves the elevation bail of a cross-points, indicator 47. Accordingly, the elevation bail moves off the center null position and deflects full scale in the up position indicating to the pilot that he must fly his aircraft upwardly to attain the proper glide slope position.

If on the other hand, the aircraft were in such a position as to receive the transmitted signals modulated with the 102 kHz. fly-down signals, the output of the amplifier 38 would consist of a 2000 Hz. signal which would be rejected by the filter 39 and passed by the filter 42. In this case, the output of the filter 42 would be rectified by detector 43, to produce a positive direct current potential, which inverted by a conventional inverter 48, producing a negative direct current potential which passes through the summing circuit 44 to the actuating coil 46, so that the negative direct current potential moves the elevation bale of the cross-pointer indicator 47 to the down position, indicating a fly-down instruction.

While the immediately preceding discussion inferentially assume all fly-down or all fly-up signals being received over the program period, it will be understood that the receiver actually responds to the information received at a much slower rate than the programing rate determined by the longest time constant of its components and particularly the actuating movement of the cross-pointer indicator 47. Thus, if during the program period the receiver receives a mix or fly-up and fly-down signals, those that predominate over the time average will actuate the cross-pointer indicator bale by an amount that is proportional to such predominance. For example, if the aircraft is at the proper glide slope position, so that equal amounts of fly-up and fly-down information is received over the time average of the program period, equal amounts of positive and negative potentials will be applied to the actuator coil 46, through the summing circuit 44 and the cross-pointer elevation bale will assume its null position, indicating to the pilot that he is at the proper glide slope angle.

As the aircraft approaches the transmitter the amplitude of the signal increases which, unless compensated for, would in effect increase the scale factor of the receiver indicator. That is to say, assuming a constant deviation from proper glide slope elevation, nevertheless, as the aircraft approaches the transmitter the magnitude of the signal appearing at the output of the summing circuit 44, increases providing greater deflection of the elevation bale, although the aircraft departure from true glide slope angle is constant.

To overcome this effect, an automatic gain control circuit is provided. To this end, the outputs of detectors 41 and 43 are summed in a summing circuit 49 and its output is applied as a negative feedback over conductor 51, to control the gain of amplifier 38. As a result, the output of the summing circuit 44 is proportional to the ratio of the time average of the signals applied to its inputs, rather than the absolute difference magnitudes of the signals applied to the input of the receiver.

Also, in order to prevent saturation of the mixer 36, as the aircraft moves the transmitter, the output of the summing circuit 49 is applied to the amplifier 34, over conductor as a further automatic gain control.

The above discussion of the operation of the receiver has been limited to a reference only to the fly-up 101 kHz. (U) and fly-down 102 kHz. (D) signals. Consider, however, that there is a mix of signals such as exemplified by Table 3, in which fly-up 111 kHz. ($U_1$) and fly-down 112 kHz. ($D_1$) signals are included in the program period.

If the pilot wishes to select the glide slope path defined by the fly-up (U) and fly-down (D) signals, he maintains the oscillator 37 at its frequency of 100 kHz. and the 1000 Hz. and 2000 Hz. signals corresponding to the fly-up (U) and fly-down (D) signals, are transmitted by the filters 39 and 42 as previously discussed, while the modulation products of the 111 kHz. fly-up ($U_1$) and the 112 kHz. fly-down ($D_1$) signals, when mived with the 100 kHz. signal generated by the oscillator 37, are rejected by the amplifier 39 and filters 39 and 42, so that they have no effect on the indicator 47. If, however, the pilot desires to select the glide slope path defined by the 111 kHz. fly-up ($U_1$) and the 112 kHz. fly-down ($D_1$) signals, or desires on approach to change over to the path so defined, he readjusts the oscillator 37, so that it generates a signal having a frequency of 110 kHz. The lower modulation products of this signal and the 111 kHz. and 112 kHz. signals will now be 1000 Hz. and 2000 Hz., respectively, so that these signals and only these signals are now passed by the amplifier 38 and filters 39 and 42, so that only the fly-up ($U_1$) and fly-down ($D_1$) signals now produce deflection indications on the indicator 47.

The disclosure has been limited, thus far, to a transmitting and receiving system for determining only glide slopes. It will be appreciated by one skilled in the art, however, that similar configurations may be utilized to produce fly-right fly-left indications. In such an instance, the transmitted beams would consist of fan shaped beams wide in elevation and narrow in azimuth filling the approach space and the width of the beams in azimuth may be made constant rather than geometrically progressing in width as described in connection with the glide slope transmitted beams. Likewise in the receiver, a duplicate channel controlling the azimuth bale would be added as set forth in Toman application, Ser. No. 620,974 filed Mar. 6, 1967, now Patent No. 3,401,389.

Several, as used in the appended claims, means more than two but not many.

What is claimed is:

1. An aircraft guidance system comprising,
   means for generating several beams of microwave energy,
   means for projecting said beams at different angles of propagation,
   means for generating a plurality of information bearing modulation signals,
   means for modulating some of said beams with one of said modulation signals,
   means for modulating others of said beams with another of said modulation signals, and
   means for modulating still other of said beams with a time-shared mix of said modulation signals.

2. An aircraft guidance system as set forth in claim 1 in which,
   said different angles of propagation are different elevation angles and said beams are wide in azimuth and narrow in elevation.

3. An aircraft guidance system as set forth in claim 2 in which the width of said beams in elevation increases as said elevation angle increases.

4. An aircraft guidance system as set forth in claim 3 in which said several beams are eight in number and which overlap in elevation angle.

5. An aircraft guidance system comprising,
   an antenna array consisting of several microwave antennas so positioned that each has a discretely different looking angle,
   each antenna when energized producing a fan shaped beam of energy wide in one dimension and narrow in the dimension orthogonal thereto;
   a microwave generator,
   switch tree means interconnecting said microwave generator and said antennas,
   a plurality of information signal generators,
   logic program control means interconnecting said information signal generator and said microwave generator to modulate the output of said microwave generator with selected information signals during discrete intervals of time under control of the program of said logic program control means,
   switch driver means interconnecting said logic program control means and said switch tree means for sequentially energizing individual ones of said antennas each during a discrete interval of time to constitute a scan of said antenna array,
   said logic program control means being programmed to operate said switch tree means to provide a plurality of scans of said antenna array over a selected program period,
   said logic program control means being further programmed so that at least some of said individual antennas have different information modulation signals impressed thereon during the discrete intervals of time occurring in different successive scans which form said program period, with at least one of said antennas having equal amounts of information modulation signals imposed thereon over the time average of said discrete intervals of time of said selected program period.

6. An aircraft guidance system as set forth in claim 5 in which,
   said different looking angles are different elevation angles and said beams are wide in azimuth and narrow in elevation.

7. An aircraft guidance system as set forth in claim 6 in which the width of said beams increases as said elevation angles increase.

8. An aircraft guidance system as set forth in claim 7 in which eight antennas are provided so positioned that the beams propagated thereby overlap in elevation angle.

9. An aircraft guidance system as set forth in claim 5 in which,
said different looking angles are different elevation angles and said beams are wide in azimuth and narrow in elevation, and
said logic program control means is so programmed that a plurality of different information modulation signals time share each discrete interval of time during which individual antennas are energized.

10. An aircraft guidance system as set forth in claim 9 in which eight antennas are provided so positioned that the respective beams propagated thereby overlap in elevation angle.

References Cited

UNITED STATES PATENTS

| | | | |
|---|---|---|---|
| 2,367,680 | 1/1945 | Kandoian | 343—108 |
| 2,602,161 | 7/1952 | Proskauer | 343—108 X |
| 3,048,842 | 8/1962 | Parker et al. | 343—106 X |
| 3,349,399 | 10/1967 | Böhm | 343—106 |

RICHARD A. FARLEY, Primary Examiner

HERBERT C. WAMSLEY, Assistant Examiner

U.S. Cl. X.R.

343—109

UNITED STATES PATENT OFFICE
CERTIFICATE OF CORRECTION

Patent No. 3,487,411                        December 30, 1969

Donald J. Toman

It is certified that error appears in the above identified patent and that said Letters Patent are hereby corrected as shown below:

Column 5, line 48, "$U_2$" should read -- $U_1$ --; line 51, "beams" should read -- beam --. Column 7, line 1, "or" should read -- of --; line 50, "mived" should read -- mixed --.

Signed and sealed this 16th day of June 1970.

(SEAL)
Attest:

Edward M. Fletcher, Jr.                        WILLIAM E. SCHUYLER, JR.
Attesting Officer                                  Commissioner of Patents